May 31, 1966 B. SAWYER 3,253,893
PRODUCTION OF ARTIFICIAL CRYSTALS
Filed April 1, 1963 4 Sheets-Sheet 2
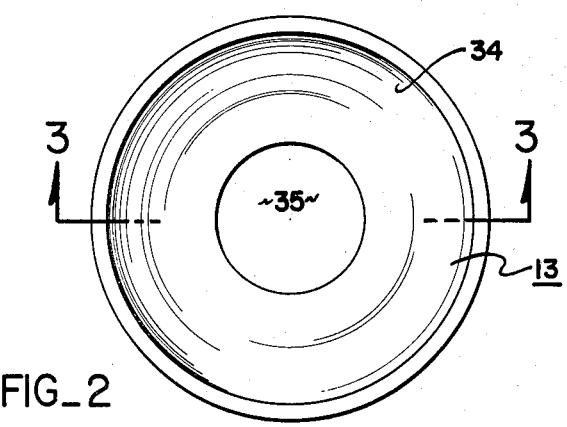
FIG_2
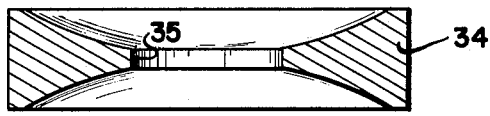
FIG_3
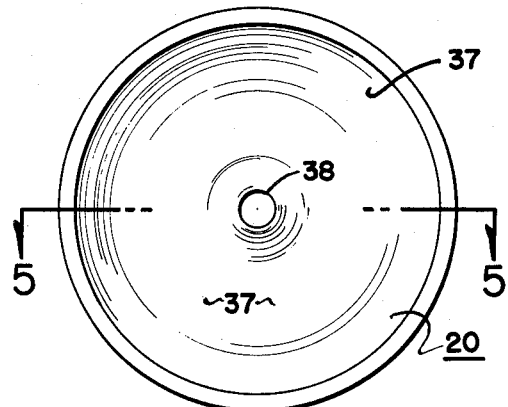
FIG_4
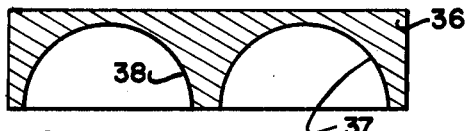
FIG_5
INVENTOR.
BALDWIN SAWYER
BY
Oberlin, Maky & Donnelly
ATTORNEYS

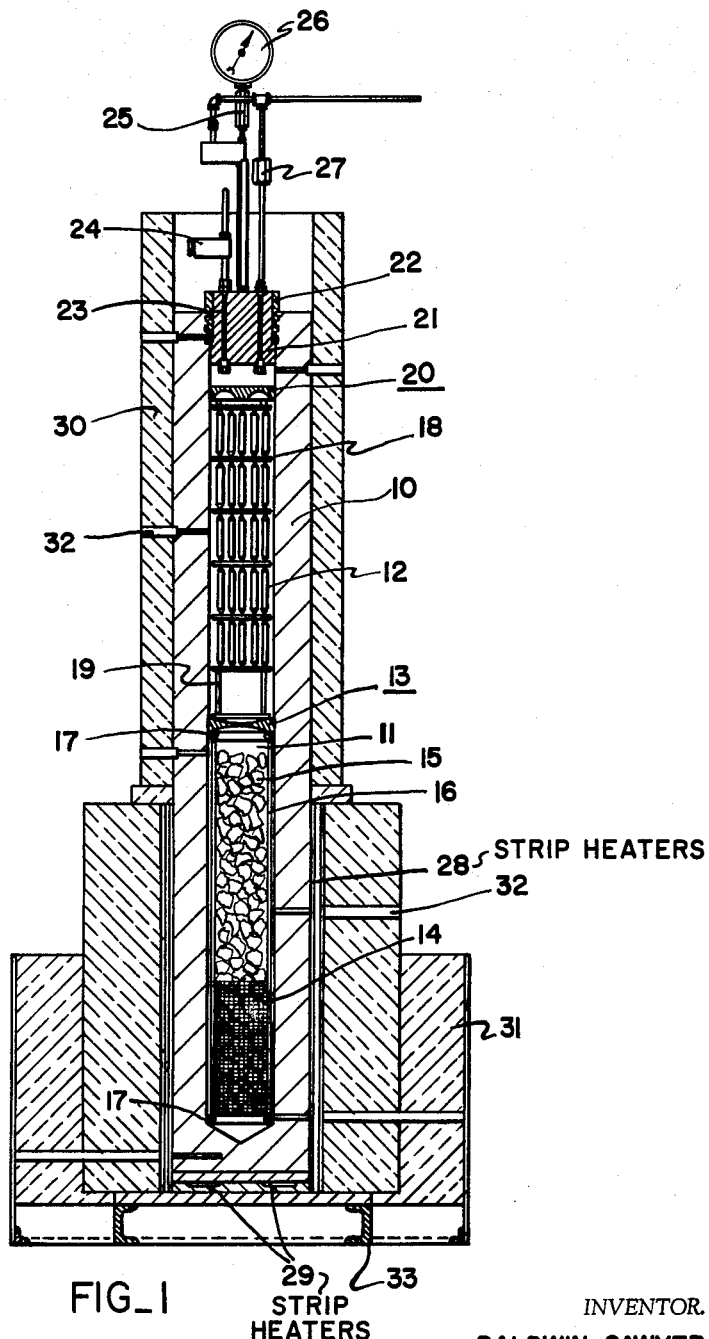
FIG_1

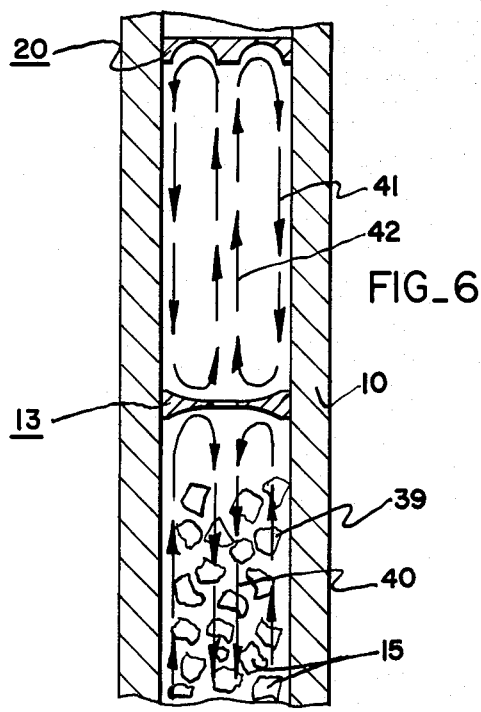
FIG_6
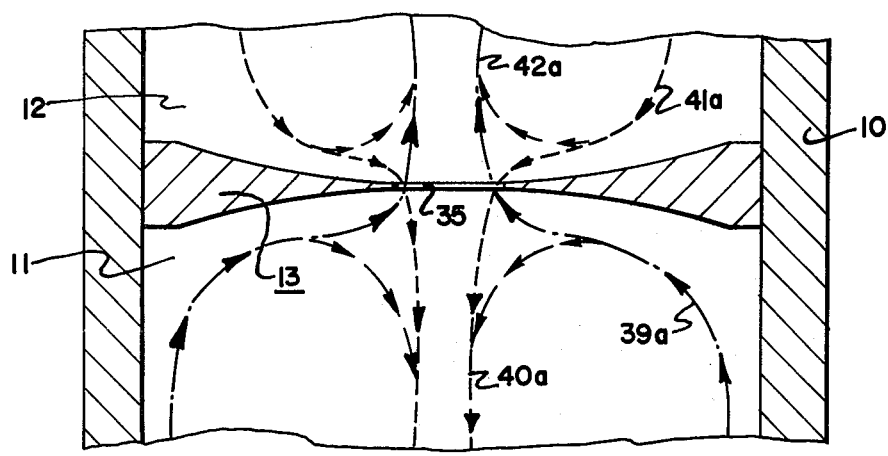
FIG_7

May 31, 1966 B. SAWYER 3,253,893
PRODUCTION OF ARTIFICIAL CRYSTALS
Filed April 1, 1963 4 Sheets-Sheet 4
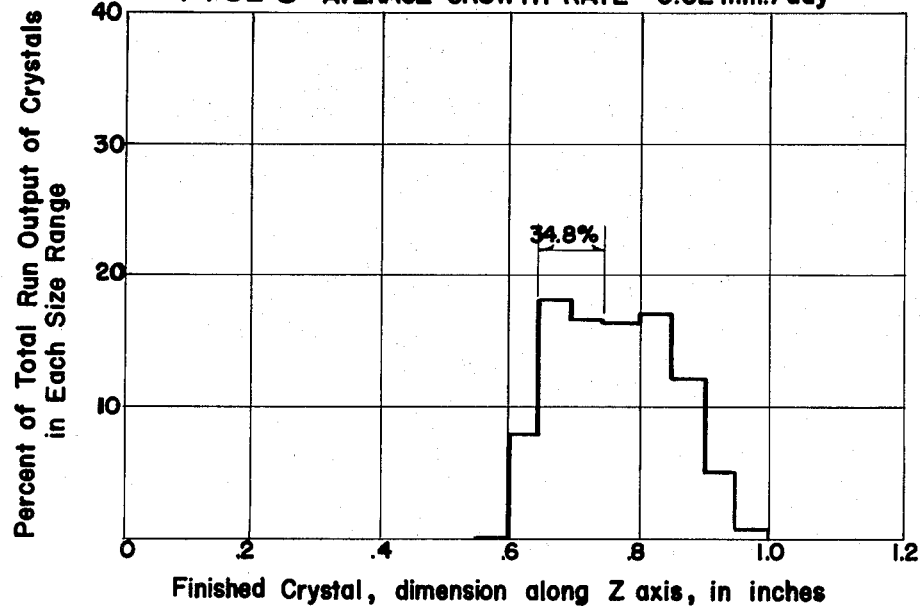
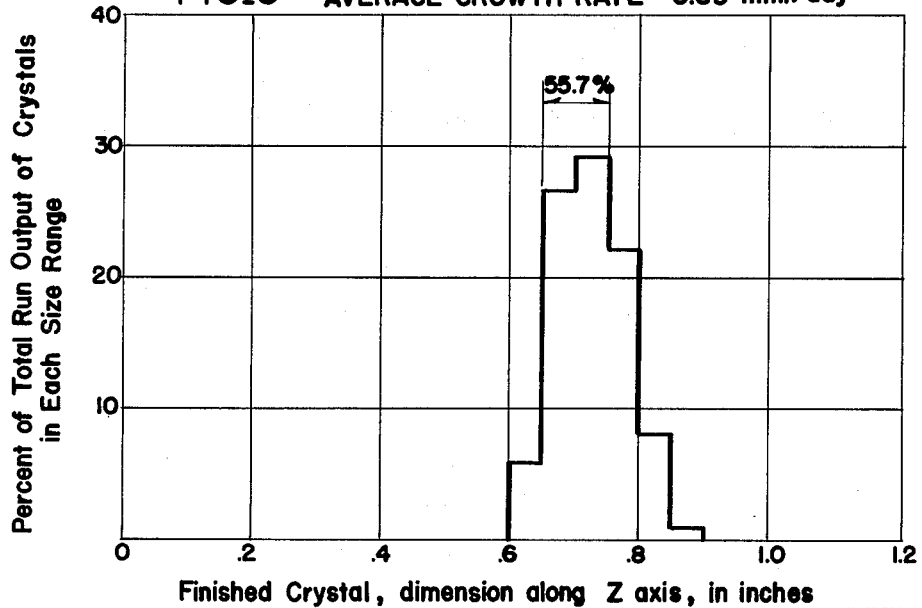
INVENTOR.
BALDWIN SAWYER
BY
Oberlin, Maky & Donnelly
ATTORNEYS

United States Patent Office 3,253,893
Patented May 31, 1966

3,253,893
PRODUCTION OF ARTIFICIAL CRYSTALS
Baldwin Sawyer, Gates Mills, Ohio, assignor to Sawyer Research Products, Inc., Eastlake, Ohio, a corporation of Ohio
Filed Apr. 1, 1963, Ser. No. 269,428
8 Claims. (Cl. 23—301)

The present invention relates to the production of artificial or cultured crystals and, more particularly, to a method and apparatus for improving the growth of pegmatitic crystals of more uniform size.

The present method and apparatus are adapted for producing various crystals, usually oxides, such as beryllium oxide and aluminum oxide. However, the invention is particularly adapted for the production of pegmatitic crystals, notably quartz crystals, and therefore for convenience of disclosure will be described in connection with such crystals. Quartz crystals are becoming increasingly important commercially not only for optical purposes but because they possess the plurality of generating an electric potential when subjected to mechanical stress and, conversely, exerting a mechanical stress when subjected to an electric potential.

In the usual manner of growing quartz crystals, a nutrient solution bathes a seed crystal either by mechanically induced means and/or by thermally induced means. The nutrient solution may comprise an aqueous alkaline solution of a siliceous material, such as pure natural quartz, and nurtures the growth of the seed by gradual deposition of the siliceous material on the seed crystal. In the usual operation, the bathing of a seed crystal by the nutrient solution takes place at rather high pressures such as 8,000 p.s.i. and at elevated temperatures such as 350° C. It is accordingly necessary to confine the seeds and mother solution in an airtight autoclave of bomb during crystal growth. Examplary of one technique of growing quartz crystals, and of which in certain respects the present invention represents additional developments in Sawyer U.S. Patent 3,013,867 which is hereby incorporated by reference.

The rate of crystal growth under the best known operating conditions is agonizingly slow. Moreover, the growing process is most sensitive and susceptible to many factors. For instance, crystals are often found to have "blue haze" and crevices. In addition, there are many other problems affecting crystal growth on a commercial scale peculiar to the simultaneous growth of a "family" of crystals. Naturally, it is desired to produce by a single run as many crystals as possible meeting predetermined sizes and quality. For example, as the limiting rate of growth for high quality crystals is approached, crystal growth becomes so susceptible to even slight changes in operating conditions that it is difficult to obtain reproducible results in consecutive runs.

One special problem often encountered is controlling the growth of as many crystals as possible so that their ultimate sizes fall within a predetermined range, that is, a target range. Uniform growth of a family of seed crystals is most difficult to achieve. In a normal run, the grown crystals may end with many times as much "growing" surface as the seeds of the crystals had at the actual start of the run. This is objectionable since it tends to promote non-uniform growth and makes control of the growing conditions much more difficult, especially in the production of an optical grade of quartz. Thus, should one crystal of a family of crystals within an autoclave inadvertently gain in growth over the others, such excessive growth is not only perpetuated but accumulated to an increasing extent. Further, since a crystal-growing operation should be stopped as soon as one crystal reaches an allowable maximum size (in order to prevent one crystal from growing into or with another), non-uniform growth or a faster growth on one or more seed crystals causes the ultimate sizes of the remaining crystals in the batch to be below expectations.

It has now been discovered that much more uniform sizes can be obtained from a family of simultaneously grown crystals by carefully controlling the flow of the nutrient solution so as to provide a more nearly homogenous mix of solute and solvent and to minimize turbulence and eddy currents. In addition the crystals obtained are of high quality, that is, substantially free of crevicing, blue haze, and the like. This has been accomplished by inducing a streamlined flow of the nutrient solution, not only in a seed-growing region but preferably also in the supply region and in the area where the nutrient solution is exchanged from the supply region to the seed-growing region.

It is, therefore, a principal object of the present invention to provide an improved method and apparatus for producing artificial or cultured crystals.

Another object is to provide such a method and apparatus for growing pegmatitic crystals of more nearly uniform size.

A further object is to provide a streamlined flow for the solution nurturing the growing crystals.

A still further object is to provide such a method and apparatus for growing a family of quartz crystals of high quality and at a substantially uniform rate.

Other objects will become apparent as the description proceeds.

To the accomplishment of the foregoing and related ends, the invention consists of the features hereinafter fully described and particularly pointed out in the claims, the annexed drawings and following disclosure describing in detail the invention, such drawings and disclosure illustrating, however, but one or more of the various ways in which the invention may be practiced.

In the accompanying drawings:

FIGURE 1 is a vertical section of an autoclave embodying the present invention;

FIGURE 2 is a plan view of baffle or exchange means used in the autoclave of FIGURE 1;

FIGURE 3 is a section of FIGURE 2 on the line 3—3;

FIGURE 4 is a bottom plan view of a sub-cover used in the seed-growing region of the autoclave of FIGURE 1;

FIGURE 5 is a section of FIGURE 4 on the line 5—5;

FIGURE 6 is a semi-diagrammatic vertical section of an autoclave shell and illustrates the general directional flow of a nutrient solution in a seed-growing region and also in a supply region;

FIGURE 7 is a semi-diagrammatic fragmentary vertical section of an autoclave shell at the area of the baffle means and shows an example of directional flow paths of a nutrient solution when passing from one region to the other;

FIGURES 8 and 9 are graphs comparing a range of crystal growth sizes obtained by means of the present invention with a range of crystal growth sizes obtained by prior techniques.

In accordance with the present invention, the nutrient solution is made to travel a streamlined low-frictional flow not only in the important seed-growing region but also in the supply region, so that the interexchange of solution between the regions also takes place smoothly.

More particularly, in carrying out the present invention, a mineral supply or mineral-dissolving region or chamber and a seed-growing region are arranged in communication with each other as by a common interconnecting area. The nutrient solution continuously flows through each region in separate, substantially independent paths of movement, and some of the solution simultaneously passes by diffusion through the interconnecting or intervening area from the supply region to the seed-growing region across which a thermal potential exists. Such exchange of solution takes place at a rate which is insufficient substantially to affect the circulation of the solution in each region.

Preferably, the two regions are vertically superposed in tandem fashion to aid in the exchange of stronger and weaker solutions between the described regions by hydrothermal currents. By a "strong solution" is meant that nutrient liquid which effects the transfer of the siliceous material, in the case of quartz crystals and the described vertical arrangement, from the lower region to the upper region by dissolving the material in the mineral-dissolving region and then depositing such material on the seed crystals in the seed-growing region. In contrast, the "weak solution" moves from the upper region to the lower region. Preferably also, the temperature in each region is substantially constant throughout the bath of liquid circulation therein. However, there is a rather sharp temperature drop between such regions, the lower temperature being in the seed-growing region. This condition not only provides the thermal potential which forces the infiltration of the solution of the mineral-dissolving region into the seed-growing region and vice versa, but it causes the solution to become supersaturated within the latter region so that deposition of the solute is readily accomplished.

As practiced by the present invention, at least one of the separate paths of nutrient solution travels a substantially continuous streamlined path or loop contiguous to the interconnecting area and desirably on both sides of such area. Preferably also, the nutrient solution in the seed-growing region traverses a smooth, arcuate or semi-toroidal path at both ends or turns in changing its direction of flow. Especially designed apparatus including baffle means and a sub-cover for the seed-growing region effect this directional flow. As a result, the nutrient solution constitutes a more nearly homogenous mix of solute and solvent, and there is a minimum of turbulence and eddy currents attendant its flow. All of this matching of the circulation to a desired curvature of flow contributes to attaining more of the family of grown crystals in a predetermined target size of range.

Referring to the drawings and particularly to FIGURE 1, an autoclave in which the present apparatus and method may be used includes a vertical tubular chamber 10 closed at the bottom and divided into a supply or mineral-dissolving region generally indicated at 11 and a seed-growing region generally represented at 12 by an improved exchange plate or baffle means 13 located centrally of the chamber 10. This chamber may be fabricated from steel of high creep strength, such as steel containing 2.25 percent chromium and 1 percent molybdenum. Within the mineral-dissolving region lies a wire mesh feed basket 14 containing quartz 15 which is to be dissolved to form a nutrient solution and to be carried to the seed-growing region 12. The quartz may be, for example, Lascas grade natural quartz. The basket 14 includes legs 16 joined at their extremities to rings 17, the upper of which supports the exchange or baffle means 13. The solvent for the quartz which fills both regions 11 and 12 may be selected from various agents known in the art, such as sodium carbonate, potassium carbonate, sodium hydroxide, and potassium hydroxide.

A seed rack 18, such as that disclosed in Sawyer U.S. Patent 3,013,867, supports a plurality of seed crystals and is stationed in the seed-growing region. The seed rack rests atop the baffle means 13 by means of legs 19. A sub-cover 20, in turn, lies upon and is supported by the seed rack 18.

A plug 21 tightly seals the upper end of the chamber 10 and has a wear-resistant collar 22 fixed to the plug 21 and threadably meshing with a threaded upper terminus of the chamber. Narrow passages 23 extend through the plug 21 to expose suitable equipment to conditions extant within the chamber 10. Such equipment may include, for example, a bleeder valve 24, a surge check valve 25, a pressure gauge 26, a rupture disk 27, and other desired testing and control equipment.

Side and bottom strip heaters 28 and 29, respectively, are secured to the lower portion or mineral-dissolving region 11 of the chamber. These strip heaters are electrically energized as through potentiometer-type controllers operating in conjunction with a thermocouple and a saturable core type transformer.

Suitable high temperature insulation 30 encompasses the length of the chamber 10 and may comprise, for instance, magnesium oxide block insulation. Additional insulation 31 such as expanded mica (vermiculite) embraces the lower end in order economically to effect in combination with the strip heaters 28 and 29 a higher temperature at that end of the chamber 10 and thereby induce thermal currents in the nutrient solution which travel upwardly and longitudinally of the chamber toward the seed-growing region 12. A series of thermocouple wells 32 spaced vertically along the autoclave penetrate to desired areas of the chamber 10 and receive thermocouples to indicate the temperature at such areas in a known manner. Standard beams 33 support the entire autoclave structure.

Referring more particularly to the baffle means, generally indicated at 13, and the sub-cover, generally indicated at 20 (FIGURES 2 through 5), the former includes a plate 34 having a peripheral configuration to match that of the chamber 10 internally. In the illustrated form, both sides of the plate 34 are concaved and joined through a single opening 35. The use of a single opening in a baffle is in itself unique, since it has been the practice to use a plurality of openings spread over the area of a baffle. The plate 13 as well as sub-cover 20 are made of mild steel and machined to shape. Preferably, each apparatus should make as tight a fit as possible with the wall of the chamber 10. In the case of the baffle means 13, this confines the flow through the opening 35. However, in any case, during a run a scale of acmite,

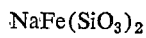
$$NaFe(SiO_3)_2$$

forms and tends to seal off any opening between the baffle means 13 and chamber 10 that may exist. The area of the opening 35 does influence the temperature drop across the plate 34 as well as the volume of flow therethrough. For most applications, the area of the opening may range from about 10 percent to about 40 percent of the area of the plate 34, that is, the interconnecting area between the regions 11 and 12.

One surprising result is that the area of the opening 35 can actually be larger than the total area of openings in previously used baffles, which employ multiple holes, in order to accomplish the same heat transfer from the dissolving to the growing chambers. When such a baffle is used, the growth rate of the crystals increases indicating that the transfer of solute has been increased for the same heat transfer. The increase in the transfer of solute (in contrast to the solvent) may be explained as the result of diffusion and mixing at the baffle in addition to the direct solution flow.

The sub-cover 20 includes a flow-control plate 36 also having a peripheral configuration to match that of the inside of the chamber 10, such configuration usually being circular. The underside or side facing the seed-growing region is also shaped to provide a streamlined flow in reversing the path of movement of the nutrient solution. In particular, the sub-cover has a channel 37 of arcuate cross-section. Desirably the channel is closed leaving a centerpiece 38, so that in relief the depression formed is semi-doughnut shaped, that is, shaped like the portion of a doughnut left by a cutting plane intersecting the longitudinal axis of the "hole" at substantially right angles. This particular configuration may thus also be considered to be semi-toroidal as the channel is viewed, for example, in FIGURE 5.

FIGURES 6 and 7 diagrammatically illustrate the circulation of the nutrient solution. It will be understood that the paths of flow of the hydrothermal currents may and do vary in force and direction from time to time and also experience momentary fluctuations. However, the general direction of movement for what has herein been defined as the "strong solution" is primarily upwardly in the mineral-dissolving region along the walls of the autoclave (which are receiving heat energy) in the general direction of the flow indicated by reference number 39, then latterly inwardly of the autoclave, and finally downwardly of the mineral-dissolving region substantially centrally thereof in the direction of flow indicated at 40. The direction of movement of what has herein been defined as the "weak solution" is primarily downwardly in the seed-growing region along the walls of the autoclave (which are radiating heat energy) in the general direction of flow as indicated by reference numeral 41, latterly inwardly of the autoclave, and finally upwardly of the seed-growing region substantially centrally thereof as indicated by the flow 42. By means of the described shapes of the plate 13 and sub-cover 20, the radially-inward flows or reversal of flows of the nutrient solution is effected in smooth streamlined flow with a minimum of turbulence and frictional resistance. The sub-cover, for example, receives the flow of nutrient solution adjacent one side of the channel 37 and discharges its flow from the other side to effect a reversal of flow in a streamlined manner.

The solution which infiltrates a given region from a companion region tends to join the general current flow of that region. For example, referring to FIGURE 7, some of the solution traversing the path 39a passes through the opening 35, and because of the forced path of travel emerges from the opening in a position immediately to join the upwardly moving path generally indicated at 42a. Conversely, some of the solution traversing the path 41a passes through the opening 35, and because of the forced path of travel emerges from the opening in a position immediately to join the downwardly moving path generally indicated at 40a. Thus, the smooth flow in each region is accompanied by a smooth interexchange of solution from region to region. To this end, the edge of the opening 35 is virtually feather-shaped. For example, the edge may be about one-eighth to one-sixteenth inch in thickness for an internal diameter of the chamber 10 of about 13 inches.

There results a substantially uniform solution temperature throughout each region. This is particularly important in the seed-growing region, because a substantially uniform temperature throughout such region coupled with uniform supersaturation means uniform deposition of the solute and therefore uniform crystal growth. Similarly, the growth rate is related to the amount of supersaturation of the nutrient solution. If the supersaturation is maintained substantially constant over the surfaces of the growing crystals, the growth rate will be substantially constant, since the concentration of the nutrient solution is actually substantially constant from top to bottom within each region by means of the present invention.

FIGURES 8 and 9 are bar graphs comparing the size distribution of acceptable crystal outputs of two growth runs. In the run illustrated by FIGURE 8, a flat perforated plate was used as the baffle (note Sawyer U.S. Patent No. 3,013,867) and no sub-cover was employed. In the run illustrated by FIGURE 9, a single hole baffle means concaved on both sides and a streamlined sub-cover were used. The conditions of the two runs were duplicated as much as possible. In order to provide substantially the same growth rate for each run and temperature drop across the baffle employed, the perforated baffle of FIGURE 8 had openings amounting to 7.5 percent of the baffle area; while the single hole baffle of FIGURE 9 had an opening amounting to 22.5 percent of the area of that baffle plate. This percentage is calculated on the orthographic projection of the plate, that is, a percentage of the cross-sectional area of autoclave.

It will be noted that the over-all range of sizes for FIGURE 8 is notably larger than that for FIGURE 9. Moreover, the amount of crystals in the target area or range amounted to only 34.8 percent for the run of FIGURE 8; while that for the run of FIGURE 9 amounted to 55.7 percent, a significant increase.

The advantages presently apparent to this invention include the following:

(1) Unobstructed flow of circulation currents, the more important being in the growing chamber. This is believed to contribute substantially to the observed improvements of:
   (a) A higher yield of non-creviced crystals.
   (b) A much lower spread in crystal sizes and tapering.
   (c) Lower over-all power consumption.
   (d) Improved controllability of the temperature drop across the baffle means when controlling by heat loss off the seed-growing region.

(2) A parallel flow of the circulation currents of the two chambers radially inwardly just above and below the single hole baffle as well which is believed to contribute to:
   (a) A maximum open baffle passageway for a given temperature drop thereacross.
   (b) Maximum diffusion of solute accompanied by a minimum of exchange of solvent across the aperture of the baffle means.
   (c) Maximum solute movement for the heat flow across the baffle plate opening.
   (d) Minimum carrying of specks upwardly across the baffle plate opening.

It will be apparent that the use of the present method and apparatus is not critical to any particular set of operating conditions. However, the following data are submitted as exemplary of one autoclave and operating conditions therefore which may be used in carrying out the invention:

| | |
|---|---|
| Inside diameter | 8 inches. |
| Volume | 79 liters. |
| Design pressure | 10,000 p.s.i. |
| Design temperature | 450° C. |
| Steel | Croloy 2¼. |
| Closure | Modified bridgeman. |
| Manufacturing method | Bored. |
| Inside height | 8 feet. |
| Outside height | 106⅝ inches. |
| Outside diameter | 14 inches. |

"Croloy" is a trade name for steel-containing chromium. By "Modified Bridgeman" is meant that conventional high pressure seal known in the art.

The operating conditions of a typical run for an autoclave of the type just described are:

| | |
|---|---|
| Solution | 0.5 to 0.83 molar sodium carbonate in water. |
| Degree of initial filling | 80%. |
| Operating temperature of seed-growing region | 335° C. to 370° C. |
| Operating temperature of mineral-dissolving region | 355° C. to 375° C. |
| Pressure | 10,000 p.s.i. |
| Number of seeds | 180 to 200 (depending on lengths). |
| Length of run (including clean out and restart) | 40 to 45 days. |
| Percent of open area of exchange plate | 22.5%. |
| Heat input | 4 kilowatts. |

A normal procedure is to load the autoclave through the opening provided by the removed plug 21 and after sealing by means of the plug to commence heating the autoclave. When the temperature of the autoclave reaches about 150° C., for example, as indicated by thermocouples, the air within the autoclave is bled through the bleeder valve 24. Heating is then continued through the heater strips 28 and 29 until a control point is reached which is normally, for instance, about 365° C. for the mineral-dissolving region 11. Subsequently, the temperature is maintained at the control point as by standard automatic electrical equipment. At the operating elevated temperature and pressure, the aqueous solvent containing sodium carbonate or the like dissolves some of the quartz material in the basket 14 of the mineral-dissolving region to an amount approaching saturation. Due to the temperature differential between the two regions, there are upward thermal currents of solution into the seed-growing region 12. Here the solution is cooled and becomes supersaturated with respect to the dissolved quartz, again because of the difference in temperature, and deposits the quartz on the seed crystals held by the rack 18.

When the seeds are grown to the desired size, as indicated for example by gammagraph measurements, the power is turned off. The autoclave is permitted to cool and then may be opened for removal of the grown crystals.

EXAMPLES 1 THROUGH 11

The following examples illustrate the greater amounts of salable crystals (meeting the same customer size and quality specifications) realized by utilizing the present invention:

| Example | Baffle, Percent Opening | Type Flat (F), Streamlined (S), Sub-Cover (SC) | Temperature Difference, ° C. | Percent Salable |
|---|---|---|---|---|
| 1 | 25 | S | 7–10 | 95 |
| 2 | 20 | S | 10–14 | 93 |
| 3 | 22.5 | S | 7–14 | 83 |
| 4 | 22.5 | S | 10–14 | 92 |
| 5 | 22.5 | F | 9–13 | 75 |
| 6 | 22.5 | S+SC | 6–12 | 73.2 |
| 7 | 22.5 | F+SC | 7–11 | 64 |
| 8 | 22.5 | S+SC | 7–12 | 67.8 |
| 9 | 22.5 | S+SC | 7–11 | 90.7 |
| 10 | 22.5 | S+SC | 7–11 | 96.4 |
| 11 | 22.5 | S+SC | 7–11 | 94 |

Other forms embodying the features of the invention may be employed, change being made as regards the features herein disclosed, provided those stated by any of the following claims or the equivalent of such features be employed.

I therefore particularly point out and distinctly claim as my invention:

1. In apparatus for growing a crystal including a mineral-dissolving chamber and a seed-growing chamber each adapted to contain a nutrient solution; the improvements including baffle means having a peripheral configuration effective to seal one chamber from the other and an opening to pass said solution solely therethrough from chamber to chamber, said baffle being provided with concave sides substantially facing each chamber, and flow-control plate means stationed in said seed-growing region and having a side substantially facing the baffle means, said side of the plate means having a semi-toroidal shaped depression, said baffle means and flow-control means cooperating to promote a streamlined flow of the nutrient solution with a minimum of turbulence.

2. The apparatus of claim 1 wherein the area of said baffle adjacent said opening is feathered outwardly from said opening to the periphery of said baffle on both sides of said baffle.

3. The method of growing pegmatitic crystals comprising heating a nutrient solution in a mineral-dissolving region of a crystal producing apparatus, circulating said solution within said region in a substantially closed path, diffusing a portion of said solution upwardly from said dissolving region solely through a single, substantially central opening between said dissolving region and a seed-growing region, circulating said solution upwardly substantially centrally through said seed-growing region in a substantially closed path to deposit nutrient of said solution on seed crystals therein, gradually reversing the direction of flow of said solution throughout the path of flow reversal in said seed growing region, further circulating said solution through said seed-growing region in said closed path, and circulating a portion of the solution from said seed-growing region through said single opening to and through said dissolving region, whereby said solution may be replenished by contact with minerals in said mineral-dissolving region.

4. A method of growing pegmatitic crystals comprising heating a nutrient solution in a mineral-dissolving chamber of a crystal producing apparatus, circulating a portion of said solution upwardly from said dissolving chamber solely through a single, substantially central opening between said dissolving chamber and a seed-growing chamber, circulating said solution upwardly substantially centrally through said seed-growing chamber to deposit nutrient of said solution on seed crystals therein, passing said solution over a semi-toroidal path at the upper surface of said seed-growing chamber to reverse gradually the direction of flow of said solution and to provide a minimum of turbulence during such reversal, further circulating said solution through said seed-growing chamber, and circulating a portion of the solution from said seed-growing chamber through said single opening to said dissolving chamber, whereby said solution may be replenished by contact with minerals in said mineral-dissolving region.

5. The method of claim 4 in which said nutrient solution is circulated upwardly through said dissolving chamber in a path adjacent a heated vertical surface of said dissolving chamber to said single, substantially central opening, and said solution is circulated downwardly through said seed-growing chamber adjacent a vertical surface thereof.

6. In apparatus for growing pegmatitic crystals including a mineral dissolving chamber and a seed growing chamber each adapted to contain a nutrient solution and means to flow such a solution past a seed crystal, the improvement comprising baffle means positioned transversely within said apparatus separating said chambers, said baffle having a peripheral configuration effective to seal one chamber from the other and a single, substantially central opening therein to pass such solution solely therethrough from chamber to chamber, and flow control means positioned in said seed growing chamber having a channel of arcuate cross-section substantially facing said baffle means.

7. The seed-growing chamber of claim 6 in which said flow-control plate has a peripheral configuration substantially matching that of the inside of said chamber to close off the end of said chamber.

8. The apparatus of claim 7 in which said baffle means is a substantially flat plate.

References Cited by the Examiner

UNITED STATES PATENTS

| | | |
|---|---|---|
| 1,353,571 | 9/1920 | Dreibodt. |
| 1,818,082 | 8/1931 | Mott _____ 165—142 XR |
| 1,966,456 | 7/1934 | Meyers. |
| 1,988,659 | 1/1935 | Lamont. |
| 2,204,180 | 6/1940 | Gerlach _____ 23—301 XR |
| 2,484,799 | 10/1949 | Swindin. |
| 2,491,618 | 12/1949 | Luetzelschwab ____ 165—142 XR |
| 2,698,779 | 1/1955 | Adams et al. |
| 2,895,812 | 7/1959 | Kohman _____ 23—273 XR |
| 3,051,558 | 8/1962 | Jost _____ 23—301 XR |

NORMAN YUDKOFF, *Primary Examiner.*

G. HINES, A. J. ADAMCIK, *Assistant Examiners.*